(12) United States Patent
Zhang et al.

(10) Patent No.: US 10,909,038 B2
(45) Date of Patent: Feb. 2, 2021

(54) CACHE MANAGEMENT METHOD, CACHE AND STORAGE MEDIUM

(71) Applicant: Chengdu Haiguang Integrated Circuit Design Co. Ltd., Chengdu (CN)

(72) Inventors: Chunhui Zhang, Austin, TX (US); Jun Cao, Chengdu (CN); Linli Jia, Chengdu (CN); Bharath Iyer, Austin, TX (US); Hao Huang, Austin, TX (US)

(73) Assignee: Chengdu Haiguang Integrated Circuit Design Co. Ltd., Chengdu (CN)

( * ) Notice: Subject to any disclaimer, the term of this patent is extended or adjusted under 35 U.S.C. 154(b) by 7 days.

(21) Appl. No.: 16/236,552

(22) Filed: Dec. 30, 2018

(65) Prior Publication Data
US 2020/0210340 A1    Jul. 2, 2020

(51) Int. Cl.
*G06F 12/00*    (2006.01)
*G06F 12/0862*    (2016.01)

(52) U.S. Cl.
CPC .... *G06F 12/0862* (2013.01); *G06F 2212/602* (2013.01)

(58) Field of Classification Search
None
See application file for complete search history.

(56) References Cited

U.S. PATENT DOCUMENTS

| | | | |
|---|---|---|---|
| 2008/0086598 A1* | 4/2008 | Maron | G06F 12/123 711/133 |
| 2008/0086599 A1* | 4/2008 | Maron | G06F 12/123 711/133 |
| 2015/0058989 A1* | 2/2015 | Lahti | H04L 63/1458 726/23 |
| 2017/0039144 A1* | 2/2017 | Wang | G06F 12/123 |
| 2019/0079877 A1* | 3/2019 | Gaur | G06F 12/128 |

* cited by examiner

*Primary Examiner* — John A Lane
(74) *Attorney, Agent, or Firm* — Barnes & Thornburg LLP; G. Peter Nichols (57) ABSTRACT

There are provided in the present disclosure a cache management method for a computing device, a cache and a storage medium, the method including: storing, according to a first request sent by a processing unit of the computing device, data corresponding to the first request in a first cache line of a cache set, and setting age of the first cache line to a first initial age value according to a priority of the first request.

16 Claims, 7 Drawing Sheets

|      | Cache line 7 | Cache line 6 | Cache line 5 | Cache line 4 | Cache line 3 | Cache line 2 | Cache line 1 | Cache line 0 |
|------|------|------|------|------|------|------|------|------|
| QSL0 | A | A | A | A | A | A | A | A |
| QSL1 |   |   |   |   | A | A | A | A |
| QSL2 | A | A | A | A | A | A |   |   |
| QSL3 |   |   | A | A |   |   |   |   |

CACHE MANAGEMENT METHOD, CACHE AND STORAGE MEDIUM

TECHNICAL FIELD

The present disclosure relates to a cache management method, in particular to a method for performing priority management on a cache, a cache and a storage medium.

BACKGROUND

Due to the increasing operating speed of computing devices, it is an effective method to utilize a cache to store data that needs to be accessed frequently and the addresses. However, since the size and amount of the cache are limited, how to manage the content stored in the cache in optimized ways becomes a significant factor influencing the performance of computing devices.

At present, in applications such as cloud computing, constant improvement of Quality of Service (QoS) for cache utilization becomes an important demand. In network function virtualization, the QoS demand becomes the driving force for new business models. Therefore, enhancements of the QoS demand (such as service availability, classes of service, bandwidth, network throughput, as well as transmission delay and terminal delay) become an important trend in the new market.

SUMMARY

In view of the problems as described above, there is proposed in the present application a cache management method for a computing device, a cache and a storage medium.

According to one aspect of the present disclosure, there is provided a cache management method for a computing device, the cache management method comprising: storing, according to a first request sent by a processing unit of the computing device, data corresponding to the first request in a first cache line of a cache set, and setting an age value of the first cache line to a first initial age value according to a priority of the first request.

In some embodiments, the priority of the first request is determined according to a priority of a thread to which the first request belongs.

In some embodiments, the priority of the first request is determined according to a request agent of the first request; and if the request agent of the first request is an instruction request, the priority of the first request is set to a first priority; if the request agent of the first request is a data request, the priority of the first request is set to a second priority.

In some embodiments, the first priority and the second priority are different priorities.

In some embodiments, the priority of the first request is determined according to a request type of the first request, and the priority of the first request is set to a corresponding level if the request type of the first request is a pre-fetch request, a demand request, a read request, a write request, or request for ownership, respectively.

In some embodiments, the method further comprises: storing, according to a second request sent by the processing unit, data corresponding to the second request in a second cache line of the cache set, and setting an age value of the second cache line to a second initial age value according to a priority of the second request; wherein in case of the priority of the first request being higher than the priority of the second request, an interval between the first initial age value and an eviction age value is larger than an interval between the second initial age value and the eviction age value.

In some embodiments, the method further comprises: receiving a third request sent by the processing unit; if the third request hits data stored in the first cache line or the second cache line, adjusting an age value of the hit cache line so that an interval between the age value of the hit cache line and the eviction age value becomes larger; if the third request does not hit any cache line in the cache set, determining whether the cache set has already been stored in full; if a determination result indicates that the cache set has already been stored in full, selecting one cache line from at least one cache line whose age value is closest to the eviction age value in the cache set, writing data stored in the selected cache line into a main memory or discarding the data, and writing data corresponding to the third request into the selected cache line, and setting an age value of the selected cache line to a third initial age value according to a priority of the third request.

In some embodiments, if the third request hits data stored in the first cache line or the second cache line, adjusting the age value of the hit cache line so that an interval between the age value of the hit cache line and the eviction age value becomes larger comprises setting the age value of the first cache line to a predetermined first hit age value if the third request hits the first cache line; setting the age value of the second cache line to a predetermined second hit age value if the third request hits the second cache line.

In some embodiments, the first hit age value and the second hit age value are same, or an interval between the first hit age value and the eviction age value is larger than an interval between the second hit age value and the eviction age value.

In some embodiments, if the third request hits data stored in the first cache line or the second cache line, adjusting an age value of the hit cache line so that an interval between the age value of the hit cache line and the eviction age value becomes larger comprises: adjusting a current age value of the first cache line by a first age value difference in order to make the interval between the age value of the first cache line and the eviction age value larger if the third request hits the first cache line.

In some embodiments, the method further comprises: if no cache line in the cache set reaches the eviction age value, adjusting age values of all cache lines in the cache set by a difference between a maximum age value existing in the current cache set and the eviction age value; if at least one cache line of the cache set reaches the eviction age value, age values of cache lines other than the selected cache line are kept unchanged.

In some embodiments, selecting one cache line from at least one cache line whose age value is closest to the eviction age value in the cache set comprises randomly selecting one cache line from the at least one cache line whose age value is closest to the eviction age value in the cache set.

In some embodiments, selecting one cache line from at least one cache line whose age value is closest to the eviction age value in the cache set comprises selecting one cache line having a lowest priority from the at least one cache line whose age value is closest to the eviction age value in the cache set.

In some embodiments, a cache unit existing in the cache set is a second-level cache (L2) or a third-level cache (L3).

In some embodiments, the age value is represented by an M-bit binary number, where M is an integer greater than 0.

According to another aspect of the present disclosure, there is further provided a processor-readable storage medium having instructions stored thereon, wherein when the instructions are executed by the processor, the cache management method as described above is performed.

According to another aspect of the present disclosure, there is further provided a cache being divided into a plurality of cache lines, each of the plurality of cache lines utilizes a M-bit register to store age value used for the cache line, respectively, wherein the a current age value indicates a relative expression of a time interval from a previous hit of the data stored in the cache line.

BRIEF DESCRIPTION OF THE DRAWINGS

In order to describe technical solutions of embodiments of the present disclosure, accompanying figures of embodiments will be introduced below briefly. Obviously, the accompanying figures described below only relate to some embodiments of the present disclosure, but are not limitations to the present disclosure.

DETAILED DESCRIPTION

In order to make purposes, technical solutions and advantages of embodiments of the present disclosure more clear, technical solutions of embodiments of the present disclosure will be described clearly and completely by combining with accompanying figures of the embodiments of the present disclosure. Obviously, the embodiments described below are a part of embodiments of the present disclosure, but not all the embodiments. Based on the embodiments of the present disclosure described below, all the other embodiments obtained by those ordinary skilled in the art without paying any inventive labor belong to the scope sought for protection in the present disclosure.

Unless otherwise defined, technical terms or scientific terms used herein shall have common meanings understood by those ordinary skilled in the art. "First", "second" and similar words used in the present disclosure do not indicate any sequence, amount or importance, but are just used to distinguish different component parts. Also, "comprise" or "include" or other similar words mean that an element or an object prior to this word covers an element or an object or an equivalent thereof listed subsequent to this word, but does not exclude other elements or objects. "Connection" or "connected to" or other similar words are not limited to physical or mechanical connection, but can comprise electrical connection, regardless of direct connection or indirect connection. "Up", "down", "left" and "right" and so on are only used to indicate a relative position relationship. After an absolute position of a described object is changed, the relative position relationship is also likely to be changed correspondingly.

In a computing device, when a processing unit sends two requests, the following case is likely to occur: one request comes from a thread of a high-priority application, while another request comes from a thread of a low-priority application. In general, due to different priorities, data processing time expected by a user is also different. In order to process a request from the high-priority application more preferentially, it is more desirable to store more data corresponding to requests from the high-priority application in the cache set. The cache set mentioned herein may refer to a shared cache in the computing device. The cache set may comprise a cache unit, for example, a second-level cache L2, a third-level cache L3 or any other level of cache that can be implemented.

The cache set mentioned in the present disclosure is composed of one or more storage units. For example, the cache set can be hardly partitioned or softly partitioned into storage units having a fixed size. In the existing computer architecture, such cache set can be called as a cache block, and the storage unit can be called as a cache line. Each storage unit may be considered as a basic unit of cache, for example, a common cache line size in a mainstream processor is 64-Byte. However, in the present disclosure, the cache set and the storage unit are not limited to forms of the cache block and the cache line.

The processing unit can comprise but is not limited to one or combination of several of central processing unit (CPU), application specific integrated circuit (ASIC), application specific instruction set processor (ASIP), physics processing unit (PPU), digital processing processor (DSP), field-programmable gate array (FPGA), programmable logic device (PLD), processor, microprocessor, controller, microcontroller, etc.

An existing cache management scheme is a cache-QoS scheme based on cache associativity.

Figure 1:
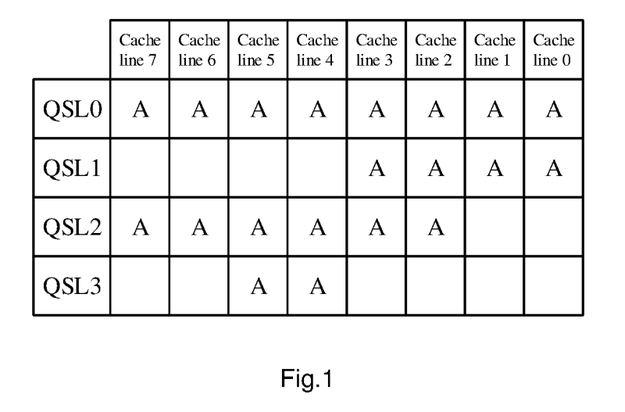
FIG. 1 shows a schematic diagram of a cache management scheme according to the prior art.

FIG. 1 shows a cache management method in prior art. In the method shown in FIG. 1, different priorities are defined for different requests, and with respect to each of the different priority levels, the method may pre-specify one or more cache lines that can be used by requests of this level in the cache set.

For example, by taking a cache set having 8 cache lines (0~7) in FIG. 1 as an example, if a priority (Quality of Service level (QSL)) of a current request is QSL0, contents corresponding to the current request can use all 8-ways cache lines 0~7 shown in FIG. 1. If there is a cache line not used in the cache lines 0~7, content corresponding to the current request can be stored (i.e., written) into any random unused cache line. For example, the content corresponding to the current request may be data and/or instructions. In the following text, for the purpose of convenient description, content stored in the cache line can be called as "data". However, those skilled in the art can understand that the cache line mentioned in the present disclosure can store instructions in addition to data. If the priority of the current request is QSL1, data corresponding to the current request can use only 4 of the 8 ways (cache lines 0~3) of cache lines. That is to say, for a request having a priority of QSL1, even if the cache lines 4-7 in the current cache set are not used, data corresponding to the request cannot be stored in the cache lines 4~7. Only an unused cache line in the cache lines 0~3 can be selected, or eviction strategy on the data stored in the cache lines 0~3 is performed, so as to replace data stored in one of the cache lines 0~3 with new data. Likewise, if the priority of the current request is QSL2, the data corresponding to the current request can use 6 cache lines 2~7 in the 8 ways. If the priority of the current request is QSL3, the data corresponding to the current request can use two cache lines 4~5 in the 8 ways.

According to the requirement for the different application scenarios, the user can set priorities with different levels for the requests, and pre-specify cache lines that can be used for requests having different priorities. In some solutions, in order to achieve the effect of allocating more cache to a thread with a higher priority, more cache lines can be allocated for the thread with higher priority.

However, the cache management scheme described above has following limitations.

Firstly, hard-partition needs to be performed on the cache in the existing cache management scheme, which causes that an optimal partition scheme cannot be achieved when the user desires to share the cache. For example, in the above cache management scheme, threads with different priorities are allocated with given cache resources according to the priority, and these fixedly allocated resources cannot be used by threads with other priorities.

Secondly, the hardware per se of the cache management scheme cannot be self-adaptive to dynamic behaviors of an application. However, the scheme by combining software and hardware has disadvantages of high complexity in adjusting and long time period for the adjusting.

Figure 2:
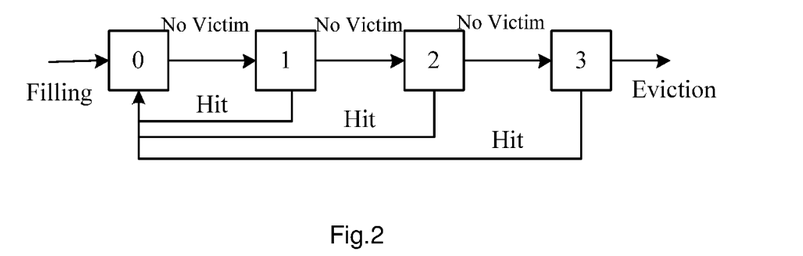
FIG. 2 shows a schematic diagram of a cache replacement scheme of the present disclosure.

FIG. 2 shows a schematic diagram of a cache replacement algorithm according to some embodiments of the present disclosure. FIG. 2 shows a cache management strategy based on re-reference interval prediction (RRIP). Its basic idea lies in that, an age value indicating an aging degree (which is a relative expression of a time interval from a previous hit) of the content stored in the cache line is stored in each cache line by an M-bit register. In an example shown in FIG. 2, M=2, that is, there are 4 different age values 0~3 that can be assigned to the cache lines. If M=3, 8 different age values can be assigned to the cache lines. In the actual application process, the above age values can be stored in the cache lines in binary numbers. In order to make it convenient for description and illustration, the present disclosure adopts a corresponding decimal number to indicate the age value of the cache lines. In addition, in order to simplify the description, in the following text, the embodiment provided in the present disclosure is described by taking the case of M=2 as an example. However, those skilled in the art can understand that the eviction strategy described below is also applicable to any case in which M equals to other positive integers.

When the age value is stored in the cache lines by a 2-bit register, 4 age values can be assigned to the cache lines, for example, 0, 1, 2, 3. In some embodiments, a larger age value may indicate that the aging degree of the cache line is greater. That is, the time interval from a previous hit of the cache line is larger. In some other embodiments, a smaller age value may indicate that the aging degree of the cache line is greater. That is, the time interval from a previous hit of the cache line is smaller. In order to make it convenient for description, in the examples provided in the text below, unless otherwise noted, it is considered that the larger the age value is, the greater the aging degree of the cache lines is. That is to say, when the age value equals to 0, it represents the aging degree of the cache line is the minimum; when the age value equals to 3, it represents that the aging degree of the cache line is the maximum In some embodiments, when the eviction strategy is performed, a maximum age value can be set to an eviction age value. For example, when the request does not hit, a cache line can be selected to be evicted from the cache lines having the maximum age value in the cache set. New data would be stored in the selected cache line, while the data previously stored in the selected cache line would be evicted. In some other embodiments, if there is no cache line having the maximum age value in the cache set, and if the request does not hit any cache line, a cache line having the largest age value can be selected in the cache set for which eviction and replacement operation would be performed.

"Replacement" mentioned in the embodiments of the present disclosure can indicate writing the content stored in the cache line back to the main memory or discarding the content, and then writing new content into the cache line.

"Hit" mentioned in the embodiments of the present disclosure shall be understood as: when the processing unit accesses one of the plurality of cache lines in the computing device, if data to be accessed by the processing unit is stored in the cache line, the request sent by the processing unit "hits". If the processing unit fails to get the data to be accessed after having accessed all the cache lines, this request does not hit. In some embodiments, the processing unit accesses the cache set of the computing device. If the data to be accessed is not read in all the cache lines in the cache set, the current request does not hit. For example, when the cache set comprises three levels of cache, the processing unit would look up in a first-level cache, a second-level cache, and a third-level cache sequentially. If data to be accessed is not read in these three levels of cache, the request does not hit.

As shown in FIG. 2, when the data corresponding to the request sent by the processing unit is filled into a cache line for the first time, the age value of this cache line can be marked as 0. In the later process of cache management, when the processing unit sends a new request, if the request does not hit, the age values of the existing cache lines can be increased depending on specific situations. In some embodiments, if there is a cache line having a current age value of an eviction age value (i.e., an age value representing the maximum aging degree, for example, when M=2, the age value 3 can be considered as the eviction age value), when the new request sent by the processing unit does not hit, an eviction cache line can be selected from all the cache lines whose current age values are the eviction age values. At this time, ages of other cache lines not evicted may keep unchanged. If the cache set has not been in full, and there is no cache line having a current age value of eviction age value in the cache set, when the new request sent by the processing unit does not hit, the content corresponding to the new request can be written into the selected eviction cache line of the cache set, and age values of all other cache lines which are stored with data but are not hit by the request are added. For example, if the current age value of one cache line is 0, and if the cache line is not hit at this time, the age value of the cache line would be increased to 1. Likewise, if the current age value of one cache line is 1, and if the cache line is not hit at this time, the age value of this cache line is increased to 2. If the cache set has been already written in full, and at the same time, there is no cache line whose current age value is the eviction age value in the cache set, the age value of the cache line in the cache set can be increased with a same value, so that the age value of the cache line in the cache set having the maximum age value reaches the eviction age value.

If the current request hits the data stored in a certain cache line, the age value of the hit cache line can be reset to 0.

If all the cache lines have been already used (i.e., if there is no null cache line), if the request sent by the processing unit does not hit any cache line, one of the cache lines having been already occupied needs to be selected to be replaced by data corresponding to the current request.

In the cache management strategy based on re-reference interval prediction as shown in FIG. 2, it may be understood that based on the age mark strategy as described above, the cache line marked as 3 has the longest interval time among all the cache lines since the previous hit. Therefore, one cache line can be selected from the cache line marked as 3, i.e., the cache line of all the cache lines having the eviction age value, to be replaced by the data corresponding to the current request. In some other embodiments, if there is no cache line among the cache set whose age value is the eviction age value, a cache line having a maximum age value in the cache set can be selected from all the cache lines to be replaced.

In this way, by utilizing the method as described above, the cache can be managed dynamically, and then the data stored in the cache line that is not hit during a period of time can be replaced through the re-reference interval.

By utilizing the cache management method provided in the present disclosure, a RRIP method that allows all the threads to use the cache resources is proposed, and different classes of quality of service can be provided, so that the cache management of different levels of quality of service is realized by soft-partition of the cache.

Figure 3:
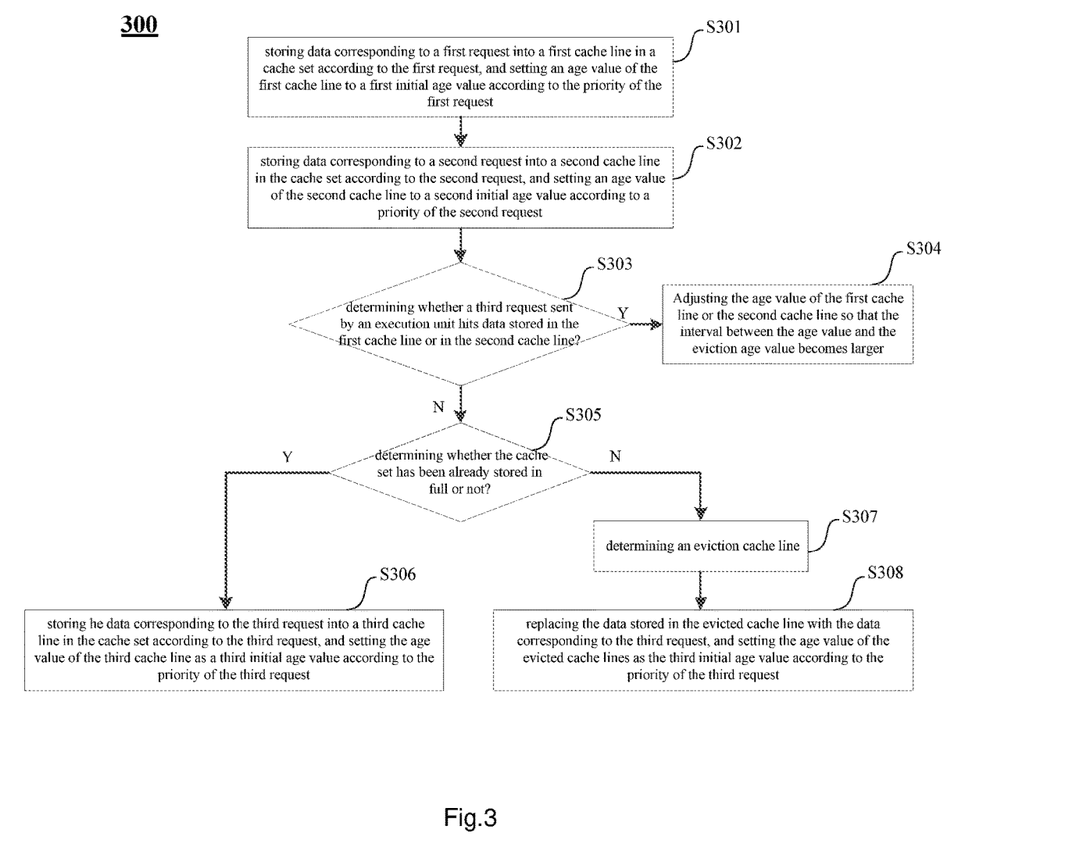
FIG. 3 shows a flow diagram of a cache management method for a computing device according to some embodiments of the present disclosure.

FIG. 3 shows a flow diagram of a cache management method 300 for a computing device according to some embodiments of the present disclosure.

Based on the concept of the cache management strategy based on the re-reference interval prediction shown in FIG. 2, there is provided according to the embodiments of the present disclosure a method being capable of performing the cache management strategy based on the re-reference interval prediction on the cache based on the priority of the threads.

As shown in FIG. 3, the cache management method 300 for the computing device according to the embodiment of the present disclosure can comprise a step S301: according to a first request having a first priority and sent by a processing unit of the computing device, storing data corresponding to the first request into a first cache line in a cache set, and setting an age value of the first cache line as a first initial age value according to the priority of the first request, wherein the priority of the first request can be determined according to a thread that sends the first request. For example, if the first request is sent by a thread having a high priority, the priority of the first request can be set to a high priority. If the first request is sent by a thread having a low priority, the priority of the first request can be set to a low priority.

Herein, different threads are given with different priority levels through configuration of the system. Correspondingly, different initial age values can be set for a cache line corresponding to a request belonging to threads with different priority levels. In some embodiments, the number of priority levels of the threads can be defined and configured by the user in the system. In some embodiments, same priority level can be given to a plurality of threads.

As described above, the computing device is provided with the cache set comprising a plurality of cache lines. In a beginning phase of the method, all the cache lines in the cache set are not occupied. When the processing unit of the computing device sends a first request, data corresponding to the first request is stored in one cache line (hereinafter referred to as "a first cache line") of the cache set. In this way, when the processing unit again sends the request with respect to the data corresponding to the first request later, the data can be read from the cache set without accessing the memory of the computing device, so as to achieve the effect of faster data read.

In some embodiments, a priority of a request which writes data into the cache line can also be stored in the cache line. In the following text, the priority of the request which writes data stored in the cache line can also be taken as the priority of the cache line.

Figure 4:
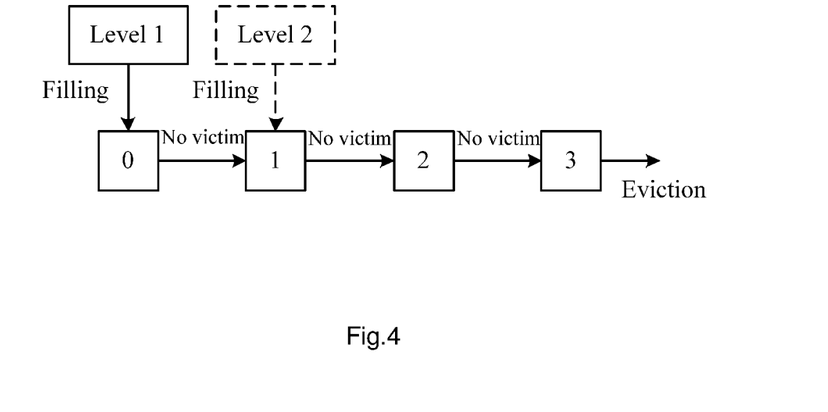
FIG. 4 shows a schematic diagram of a data filling operation with respect to requests having different priorities according to some embodiments of the present disclosure.

FIG. 4 shows a schematic diagram of a data filling operation with respect to requests having different priorities according to some embodiments of the present disclosure.

As shown in FIG. 4, the user can set the age value of a first cache line to be filled to a corresponding first initial age value according to the level of the priority of the current request. In some embodiments, if the priority of the current request is level 1, the age value of the first cache line can be set to 0. In some other embodiments, if the priority of the current request is level 2, the age value of the first cache line is set to 1. By analogy, the user can preset the priority of the request sent by the processing unit and the initial age value corresponding to the priority. For example, for a priority of level-3, the corresponding initial age value can be set to 2. For a priority of level-4, the corresponding initial age value can be set to 3.

In the example as shown in FIG. 4, the larger the age value is, the easier the cache line is to be evicted and the stored cache data would be replaced with the data corresponding to a new request.

In some other embodiments, it is understandable that the eviction strategy can be set to: the smaller the age value is, the easier the cache line is to be evicted. That is, the process shown in FIG. 4 is inversed. For example, when new cache data is filled into a cache line, the age value of the cache line can be set to 3. If a following request fails to hit the cache line, the age value of the cache line would be subtracted by 1, for example, the age value being changed to 2. By analogy, when the cache set is stored in full yet, one cache line can be selected from the cache lines having the age value of 0 as an eviction cache line, and the data stored therein would be replaced.

In the following text, for the purpose of briefness, the aging sequence as shown in FIG. 4 would be adopted for description, that is, the smaller the age value is, the larger the interval of the age value of the cache line away from the eviction age value is. Those skilled in the art can understand that this process can be changed reversely, so that the larger the age value is, the larger the interval of the age value of cache line away from the eviction age value is. The following text would not give further descriptions in view of the above problems.

It can be seen that by utilizing the data filling operation with respect to the requests having different priorities provided in FIG. 4, the age value of cache lines with data having a higher priority can be set to have a larger interval away from the eviction age value, i.e., more cache resources are allocated to a request having a higher priority.

Figure 5:
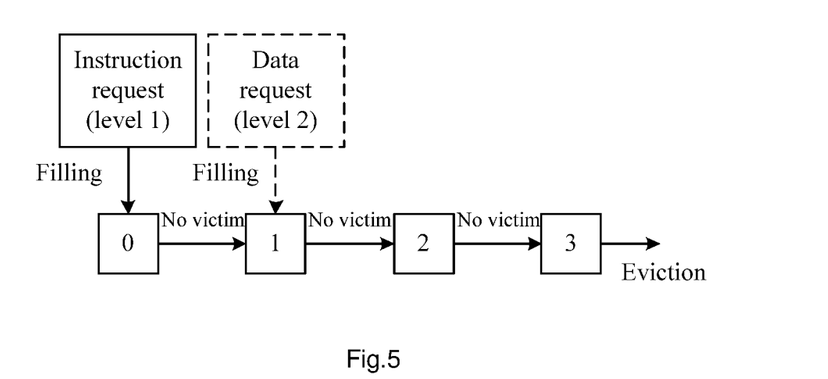
FIG. 5 shows a schematic diagram of determining a priority of a request with respect to a request agent of the request according to some embodiments of the present disclosure.

FIG. 5 shows a schematic diagram of determining a priority of a request with respect to a request agent of the request according to some embodiments of the present disclosure.

In some embodiments, a priority of a request can be determined according to a request agent of the request sent by the processing unit. For example, if the request agent is an instruction request, the priority of the request may be set to level 1; if the request agent is a data request, the priority of the request may be set to level 2. As shown in FIG. 5, if the request agent of the request is the instruction request, an initial age value of a cache line that stores the data corresponding to the request can be set to 0. If the request agent of the request is the data request, the initial age value of the cache line that stores the data corresponding to the request can be set to 1.

It can be seen that by utilizing the data filling operation for the requests of different request agents provided in FIG. 5, different cache resources can be allocated to requests of different request agents.

In some embodiments, the priority level of the request can also be determined according to a request type of the request sent by the processing unit. For example, the request sent by the processing unit may be a pre-fetch request, a demand request, a read request, a write request, or a Request For Ownership (RFO), etc. For each type of request, a corresponding priority level can be set respectively. In some embodiments, priority levels set for different request types may be different from each other. In some other embodiments, priority levels set for different request types may be the same. For example, the priority of the request of the pre-fetch type can be set to level 3, and the priority of the request of the RFO type can be set to level 1, and so on and so forth.

In some embodiments, the priority level of the request can be determined based on the request agent and the request type. FIG. 1 shows an exemplary mode of determining the priority level of the request based on both of the request agent and the request type.

TABLE 1

| Instruction request | | Data request | |
| --- | --- | --- | --- |
| Pre-fetch | Level 3 | Pre-fetch | Level 3 |
| Read | Level 1 | Read | Level 2 |
| | | Write | Level 1 |
| | | RFO | Level 2 |

Figure 6:
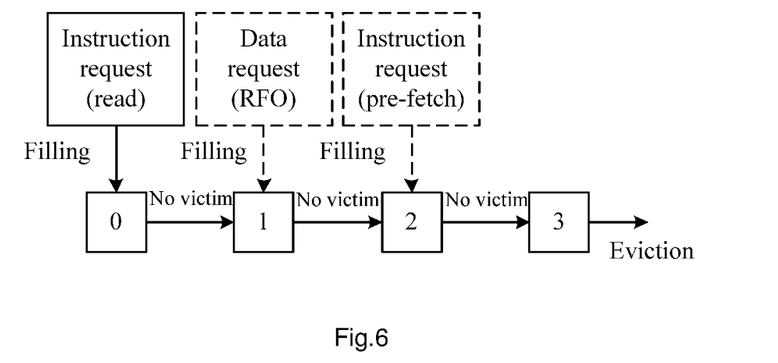
FIG. 6 shows an exemplary schematic diagram of an filling operation performed with respect to data of requests of different request agents according to some embodiments of the present disclosure.

FIG. 6 shows an exemplary schematic diagram of a filling operation performed for data of requests of different request agents according to some embodiments of the present disclosure.

As shown in FIG. 6, for example, if the request sent by the processing unit is an instruction request of a read type, according to the example shown in Table 1, the priority of the request can be set to level 1. When the data corresponding to the request is written into the cache line, the initial age value of the cache line can be set to 0. For another example, if the request sent by the processing unit is a data request of the RFO type, the priority of the request can be set to level 2. When the data corresponding to the request is written into the cache line, the initial age value of the cache line can be set to 1. For another example, if the request sent by the processing unit is an instruction request of the pre-fetch type, the priority of the request can be set to level 3. When the data corresponding to the request is written into the cache line, the initial age value of the cache line can be set to 2.

It can be seen that by utilizing the embodiment of the present disclosure, priority levels of requests can be set with respect to requests of different request agents and request types respectively, and the initial age value of the cache line that stores the data corresponding to the request is set based on the priority level. That is to say, by utilizing the cache management strategy provided by the present disclosure, different cache resources can be allocated to requests with different request agents and different request types.

Referring back to FIG. 3, the cache management method 300 according to the embodiment of the present disclosure as shown in FIG. 3 can further comprise a step S302: storing data corresponding to a second request having a second priority and sent by the processing unit into a second cache line in the cache set, and setting an age value of the second cache line to a second initial age value according to a priority of the second request; wherein the priority of the first request is higher than the priority of the second request, the interval between the first initial age value and the eviction age value is larger than that between the second initial age value and the eviction age.

It needs to be specified that the "first request", the "second request", the "first cache line", and the "second cache line" mentioned in the above text do not mean that the first request and the second request have to be different. In fact, the first request and the second request may be requests from same thread or different threads. Types of the first request and the second request may be the same or may be different. The first request and the second request may be requests sent at the same time, or may be requests sent at different times. The first request and the second request may be two continuously reached requests, or may be two non-continuously reached requests. The first cache line and the second cache line may be a same cache line, or may be different cache lines. "First priority" and "second priority" mentioned above are just used to distinguish priority levels used for two different requests. The first priority and the second priority may be the same, or may be different.

As described above, according to the eviction strategy provided in the present disclosure, the larger the interval between the age value of the cache line and the eviction age value is, the more difficult the cache line is to be evicted. Therefore, by setting an initial age value for a cache line in which the data corresponding to a request having a higher priority is stored to be farther away from the eviction age value, more cache resources may be allocated to high-priority requests.

As shown in FIG. 3, the cache management method 300 can further comprises a step S303: determining whether a third request sent by an processing unit hits data stored in the first cache line or in the second cache line. If a determination result is "yes", step S304 is performed; if the determination result is "no", step S305 is performed. Although an expression of "third request" is used herein, "third" herein does not limit a reaching sequence of the request, but is just used to distinguish this request from the first request and the second request. In fact, the third request herein may be a random n-th request sent by the computing device in the running process. The third request herein and the first request, the second request may come from the same thread, or may come from different threads. The third request and the first request, the second request may be requests of a same type, or may be requests of different types.

In the step S304, if the third request hits data stored in the first cache line or the second cache line, the age value of the hit cache line is adjusted so that the interval between the age value and the eviction age value becomes larger.

As described above, according to the eviction strategy provided in the embodiment of the present disclosure, if the current request hits data stored in one cache line of the cache set, the age value of the cache line is adjusted so that the age value becomes farther away from the eviction age value, and thus the hit cache data is more difficult to be replaced with new data.

Figure 7A:
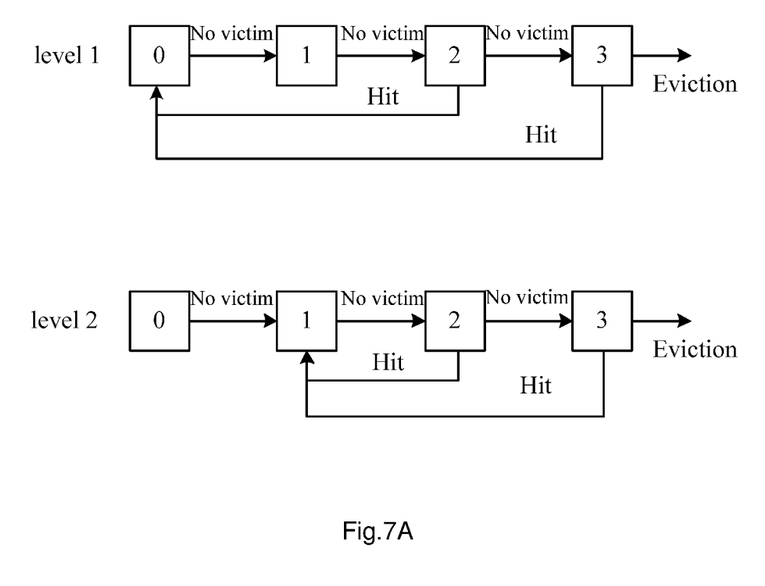
FIG. 7A shows one schematic diagram of an eviction strategy according to some embodiments of the present disclosure.
Figure 7B:
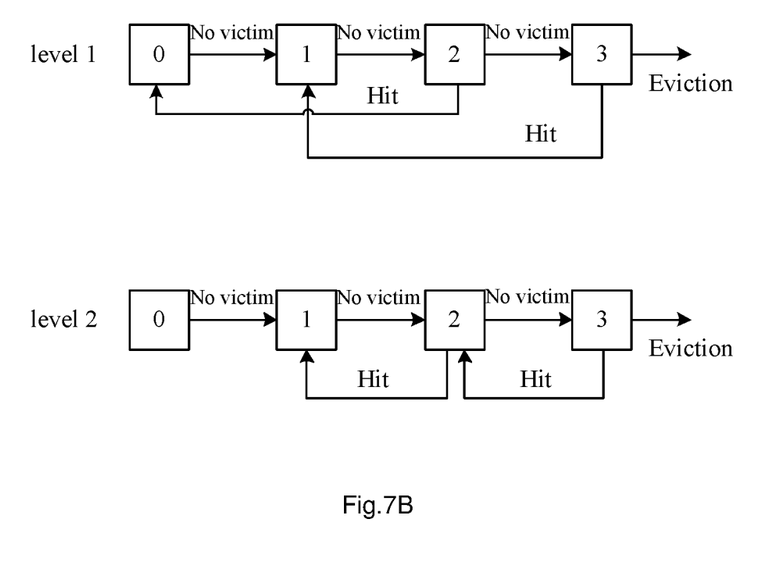
FIG. 7B shows another schematic diagram of an eviction strategy according to some embodiments of the present disclosure.

FIGS. 7A and 7B show schematic diagrams of the eviction strategy according to some embodiments of the present disclosure. For example, if a specific request hits a certain cache line, the age value of the hit cache line can be adjusted to a preset "hit age value". The hit age value may be the same as the initial age value corresponding to the request, or may be different from the initial age value corresponding to the request. Those skilled in the art can set the hit age value and the initial age value used for the request according to the actual requirements. In some embodiments, the hit age value may be smaller than or equal to the initial age value.

In some embodiments, in the eviction strategy, a priority of a request corresponding to the data/instruction(s) stored in the cache line is not considered, while the same eviction strategy is performed on all the cache lines.

In some other embodiments, the age value of the hit cache line can be adjusted according to the priority of the request which hits the cache line, i.e., different eviction strategies are performed on different cache lines. For example, more cache resources are allocated to the request having a higher priority. The following embodiments are described under an assumption that a priority of level 1 is higher than a priority of level 2.

As shown in FIG. 7A, for example, if a request having the level-1 priority hits a cache line, the age value of the hit cache line is adjusted to a preset first hit age value, for example, an age value of 0. The first hit age value herein may be the same as the initial age value corresponding to the priority of level 1, or may be different from the initial age value corresponding to the priority of level 1. Those skilled in the art can set the first hit age value according to the actual requirement.

Similarly, if a request having the level-2 priority hits the cache line, the age value of the hit cache line is adjusted to the preset second hit age value, for example, an age value 1. The second hit age value herein may be the same as the initial age value corresponding to the priority of level 2, or may be different from the initial age value corresponding to the priority of level 2.

As shown in FIG. 7A, the first hit age value corresponding to the cache line hit by the request having a high level-1 priority can be set so that an interval between the first hit age value and the eviction age value is larger than that between the second hit age value corresponding to the level-2 and the eviction age value. In this way, upon each hit, the age value of the cache line of the higher priority would be adjusted to be farther away from the eviction age value, so that the cache line of the high priority is not easy to be evicted, so as to allocate more cache resources to cache data with higher priority.

In some additional embodiments, if the request having a specific priority hits a certain cache line, the current age value of the cache line can be adjusted by a first age value difference towards the direction away from the eviction age value according to the priority of the request. In the example shown in FIG. 7B, for the cache line hit by the level-1 request, if the age value is 2 when the cache line is hit, the age value of the cache line is subtracted by 2, i.e., being adjusted to 0. If the age value is 3 when the cache line is hit, the age value of the cache line is subtracted by 2, i.e., being adjusted to 1.

In some embodiments, if the current age value of the hit cache line is relatively small, the age value of the cache line can be adjusted to the minimum age value used for the cache line, such as an initial age value corresponding to the data stored in the cache line. For example, for the level-1 cache line, if the age value is 1 when the cache line is hit, while the first age value difference is 2, and then if the first age value difference is subtracted from the current age value simply, a meaningless negative number would be obtained. Therefore, in this case, this cache line can be adjusted to 0. Similarly, for the level-2 cache line, if the age value is 2 when the cache line is hit, the age value of this cache line can be adjusted to 1. In some other embodiments, the initial age value of the cache line may not be considered. If the an age value obtained by subtracting the first age value difference from the current age value is smaller than the minimum age value of the system, the age value of the cache line is adjusted to the minimum age value of the system.

Similarly, if the level-2 request hits the cache line, the current age value of the cache line is adjusted by a second age value difference towards the direction away from the eviction age value.

In some embodiments, for cache lines hit by requests having different priority levels, the first age value difference and the second age value difference may be the same. That is, in the eviction strategy, the priority of the request corresponding to the hit data/instruction(s) is not considered, while the same eviction strategy is performed on all the cache lines.

That is to say, in the eviction strategy provided according to the present disclosure, the higher the priority of the cache line is, the faster the age value being away from the eviction age value is, when the cache line is hit. Therefore, by utilizing the above method, it can also make the high-priority cache line is more difficult to be evicted, thereby more cache resources are allocated to the cache data with higher priority.

In some other embodiments, different eviction strategies can be performed on the cache lines of different priorities according to the priority of the request corresponding to which the data is written into the cache line, and the priority of the request is stored in the cache line, thereby the effect of allocating more cache resources to the request having a higher priority can be achieved.

For example, for a specific cache line, if the priority of the corresponding request is level 1 when the data is written into the cache line, if this cache line is hit, the age value of the cache line can be adjusted to a predetermined first hit age value, for example, the age value 0. The first hit age value may be the same as the initial age value corresponding to the level 1, or may be different. Those skilled in the art can set the first hit age value according to the actual situation.

Similarly, if the priority of the corresponding request is level 1 when the data is written into the cache line, when this cache line is hit, the age value of the cache line can be adjusted to a predetermined second hit age value, for example, the age value 1. The second hit age value herein may be the same as the initial age value corresponding to level 2, or may be different from the initial age value corresponding to level 2.

In some other embodiments, the current age value of the cache line is adjusted by the first age value difference towards the direction away from the eviction age value according to the stored priority of the request corresponding to which the data is written into the cache line. If the priority of the corresponding request is level 1 when the data is written into the cache line, if this cache line is hit, and if its age value is 2, the age value of the cache line can be subtracted by 2, i.e., the age value is adjusted to 0. If the priority of the corresponding request is level 2 when the data is written into the cache line, if this cache line is hit, and if its age value is 2, the age value of the cache line can be subtracted by 1, i.e., adjusted to 1. In step S305, if the third request does not hit any cache line in the cache set, determination of whether the cache set has been already stored in full is performed. If the cache set has been stored in full, then step S307 is executed. If the cache set has not been stored in full yet, then step S306 is executed.

In step S306, since the cache set has not been stored in full yet, i.e., there is a cache line not occupied in the cache set, the data corresponding to the third request is stored into a third cache line in the cache set according to the third request, and the age value of the third cache line is set to a third initial age value according to the priority of the third request. This process is similar to the processes with respect to the first request and the second request in steps S301 and S302, and thus no further details are given herein.

In step S307, since the cache set has been stored in full, i.e., there is no unoccupied cache line, in order to store new data in the cache set, one eviction cache line may be selected from the cache lines having been occupied. The data stored in the selected eviction cache line may be replaced with the data corresponding to the third request, and the age value of the eviction cache lines is set to the third initial age value according to the priority of the third request.

At the same time, the ages of the cache lines not being hit can be adjusted so that the intervals between the ages of the cache lines and the eviction age value becomes smaller. For example, the ages of the cache lines not being hit can be adjusted so that the intervals between the ages of the cache lines and the eviction age value becomes smaller may comprise adjusting the age value of the cache lines not being hit by age value differences towards the direction closer to the eviction age value. The age value difference mentioned herein may be a number greater than or equal to zero.

In some embodiments, the same age value adjusting strategy can be performed for the cache lines having different priorities, i.e., adjusting all the cache lines not being hit by a same age value difference towards the direction closer to the eviction age value.

In some embodiments, different age value adjusting strategies can be performed for the cache lines having different priorities. For example, for a cache line having a higher level-1 priority, if this cache line is not hit, its age value would be adjusted by a third age value difference towards the direction close to the eviction age value. For a cache line having a lower level-2 priority, if this cache line is not hit, its age value can be adjusted by a fourth age value difference towards the direction close to the eviction age value. Herein, the third age value may be smaller than the fourth age value. That is to say, in the eviction strategy provided according to the present disclosure, the higher the priority of the cache line is, the slower the speed of the cache line being close to the eviction age value is, if the cache line is not hit. Therefore, by utilizing the above method, it can also make the cache line having the high priority more difficult to be evicted, thereby more cache resources are allocated to the cache data with the high priority.

In some other embodiments, for some especially important data, the age value of the cache line that stores these important data can be locked. For example, the age value of the cache line storing important data can be locked as 0. That is to say, even if the current request does not hit the cache line, the age value of the locked cache line would not be changed, so as to achieve the effect that the important data can be always stored in the cache set, and would not be replaced by other data.

In some embodiments, selecting one eviction cache line from the cache lines having been occupied in the cache set can comprise: randomly selecting one cache line from one or more cache lines in the cache set having a smallest interval from the eviction age value as an eviction cache line.

Figure 8:
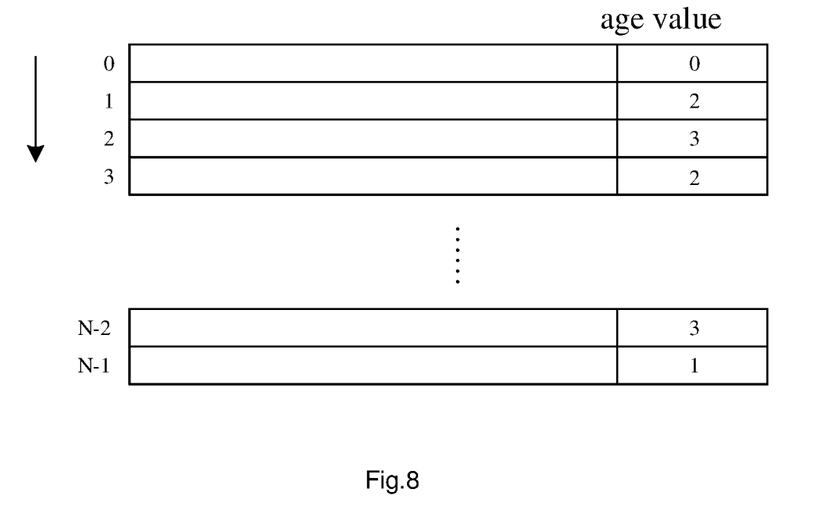
FIG. 8 shows a schematic diagram of an operation of selecting an eviction cache line according to some embodiments of the present disclosure.

FIG. 8 shows a schematic diagram of the operation of selecting the eviction cache line. As shown in FIG. 8, the cache set comprise N cache lines, wherein N is an positive integer. FIG. 8 schematically shows only part of cache lines. In some embodiments, by taking the maximum age value 3 being the eviction age value as an example, respective cache lines in the cache set can be looked up according to a predetermined order, and a first found cache line having the maximum age value 3 is taken as the eviction cache line. By taking the example as shown in FIG. 8 as an example, if the operation of looking up is performed starting from the cache line 0 towards the direction of a cache line N−1, the cache line 2 would be selected as an eviction cache line.

In some other embodiments, if there is no cache line having the maximum age value in the cache set, that is, the previous process of looking up does not obtain any result, the eviction age value can be reduced and the above process is repeated. For example, the operation of looking up is performed starting from the cache line 0 towards the direction of the cache line N−1, and the first found cache line having the maximum age value 2 is taken as the eviction cache line.

In some other embodiments, a cache line having the lowest priority can be selected from one or more cache lines in the cache set having the maximum age value as the eviction cache line, so that cache lines with higher priority are more difficult to be evicted, thereby more cache resources are allocated to the caches with high priority.

By utilizing the cache management method provided in the present disclosure, soft-partition can be performed on the cache of the computing device. Through the cache management strategy based on the priority of the thread and the re-reference interval, more cache resources can be allocated to the higher priority content, and at the same time the dynamic management can be realized.

By utilizing the cache management method provided in the present disclosure, the service quality management of the cache is realized by means of adjusting the replacement distance. This method solves the problems that would occur in hard-partition resource allocation, it is capable of using valuable memory resources in a more adaptive manner.

By utilizing the cache management method provided in the present disclosure, the RRIP age value range can be extended to more QoS service levels by taking the request type and the request agent as a plurality of parameters for adjusting the cache resources.

According to another aspect of the present disclosure, there is further provided a cache being divided into a plurality of cache lines, each of which stores the age value for the cache line by an M-bit register, respectively, wherein the age value indicates a relative expression of a time interval from a previous hit of the data stored in the cache line. For example, when data/instruction(s) is written into the cache line, an initial state of the data stored in the cache line is indicated by setting an initial age value. For data written by requests having different priorities, different initial age values can be set. The data corresponding to the request having the low priority is artificially set to have a longer time interval since the previous hit. For another example, for a cache line in which data/instruction(s) has been written, the age value can indicate the real time interval for the data in the cache line since the previous hit.

Those skilled in the art can clearly know that the present disclosure can be realized by means of software combined with necessary general hardware, and of course can be realized by a special hardware. However, in many scenarios, the former is likely to be a preferred implementation. Based on such understanding, the technical solutions of the present disclosure are reflected by means of software, hardware, firmware or random combination thereof. The computer software product is stored in a readable storage medium, such as a magnetic storage medium (for example, a hardware) or an electronic storage medium (for example, ROM, flash memory), and so on, comprising several instructions to make one computing device (it may be a computer, a serve or a network device, and so on) execute the method as described in respective embodiments of the present disclosure.

Those skilled in the art shall understand that the embodiments of the present disclosure can be implemented as a method, a system, or a computer program product. Therefore, the embodiments of the present disclosure may be hardware, software, firmware or a form of any combination of the above. Furthermore, the embodiments of the present disclosure can adopt a form of a computer program product implemented on one or more computer available storage medium comprising computer available program codes (including but not limited to a magnetic disk memory, CD-ROM, an optical memory, etc.).

The present disclosure is described by referring to the method, device (system), and computer program product of the embodiments of the present disclosure. It shall be understood as that each flow and/or block in the flow diagram and/or block diagram, and combination of flows and/or blocks in the flow diagram and/or block diagram can be realized by the computer program instruction. These computer program instructions can be provided to a general computer, a special computer, an embedded processing machine or a processor of other programmable data processing device to obtain a machine, so that an apparatus used for realizing functions assigned in one flow or a plurality of flows and/or one block or a plurality of blocks in the block diagram is produced through an instruction executed by a computer or a processor of other programmable data processing device.

These computer program instructions can also be stored in a computer readable memory being capable of guiding a computer or other programmable data processing device to operate in a specific manner, so that the instruction stored in the computer readable memory generates a manufacturer including an instruction apparatus. The instruction apparatus realizes functions assigned in one or more flows of the flow diagram and/or one block or a plurality of blocks of the block diagram. These computer program instructions can also be loaded on the computer or other programmable data processing device, so that a series of operation steps are performed on the computer or other programmable devices, and thus the instruction executed on the computer or other programmable devices.

The above descriptions are just exemplary implementations of the present disclosure, but are not used to limit the protection scope of the present disclosure. The protection scope of the present disclosure is determined by the attached claims.

What is claimed is:

1. A cache management method for a computing device, comprising:
    storing, according to a first request sent by a processing unit of the computing device, data corresponding to the first request in a first cache line of a cache set, and setting age value of the first cache line to a first initial age value according to a priority of the first request
    receiving a third request sent by the processing unit;
    if the third request does not hit any cache line in the cache set, determining whether the cache set has already been stored in full;
    if a determination result indicates that the cache set has already been stored in full, selecting one cache line from at least one cache line whose age value is closest to the eviction age value in the cache set, writing data stored in the selected cache line into a main memory or discarding the data;
    wherein selecting one cache line from at least one cache line whose age value is closest to the eviction age value in the cache set comprises:
        selecting one cache line having a lowest priority from the at least one cache line whose age value is closest to the eviction age value in the cache set.

2. The cache management method according to claim 1, wherein the priority of the first request is determined according to a priority of a thread to which the first request belongs.

3. The cache management method according to claim 1, wherein the priority of the first request is determined according to a request agent of the first request; and if the request agent of the first request is an instruction request, the priority of the first request is set to a first priority; if the request agent of the first request is a data request, the priority of the first request is set to a second priority.

4. The cache management method according to claim 3, wherein the first priority and the second priority are different priorities.

5. The cache management method according to claim 1, wherein the priority of the first request is determined according to a request type of the first request, and the priority of the first request is set to a corresponding level if the request type of the first request is a pre-fetch request, a demand request, a read request, a write request, or request for ownership, respectively.

6. The cache management method according to claim 1, further comprising:
    storing, according to a second request sent by the processing unit, data corresponding to the second request in a second cache line of the cache set, and setting and age value of the second cache line to a second initial age value according to a priority of the second request;
    wherein in case of the priority of the first request being higher than the priority of the second request, an interval between the first initial age value and an eviction age value is larger than an interval between the second initial age value and the eviction age value.

7. The cache management method according to claim 6, further comprising:
    if the third request hits data stored in the first cache line or the second cache line, adjusting an age value of the hit cache line so that an interval between the age value of the hit cache line and the eviction age value becomes larger; and writing data corresponding to the third request into the selected cache line, and setting age value of the selected cache line to a third initial age value according to a priority of the third request.

8. The cache management method according to claim 7, wherein if the third request hits data stored in the first cache line or the second cache line, adjusting an age value of the hit cache line so that an interval between the age value of the hit cache line and the eviction age value becomes larger comprises:

setting the age value of the first cache line to a predetermined first hit age value if the third request hits the first cache line;

setting the age value of the second cache line to a predetermined second hit age value if the third request hits the second cache line.

9. The cache management method according to claim 8, wherein the first hit age value and the second hit age value are same, or an interval between the first hit age value and the eviction age value is larger than an interval between the second hit age value and the eviction age value.

10. The cache management method according to claim 7, wherein if the third request hits data stored in the first cache line or the second cache line, adjusting an age value of the hit cache line so that an interval between the age value of the hit cache line and the eviction age value becomes larger comprises:

adjusting a current age value of the first cache line by a first age value difference in order to make the interval between the first age and the eviction age value larger if the third request hits the first cache line.

11. The cache management method according to claim 7, further comprising:

if no cache line in the cache set reaches the eviction age value, adjusting age values of all cache lines in the cache set by a difference between a maximum age value existing in the current cache set and the eviction age value;

if at least one cache line of the cache set reaches the eviction age value, age values of cache lines other than the selected cache line are kept unchanged.

12. The cache management method according to claim 7, wherein selecting one cache line from at least one cache line whose age value is closest to the eviction age value in the cache set comprises:

randomly selecting one cache line from the at least one cache line whose age value is closest to the eviction age value in the cache set.

13. The cache management method according to claim 1, wherein a cache unit existing in the cache set is a second-level cache (L2) or a third-level cache (L3).

14. The cache management method according to claim 1, wherein the age value is represented by an M-bit binary number, where M is an integer greater than 0.

15. A non-transitory processor-readable storage medium having instructions stored thereon, wherein when the instructions are executed by the processor, the cache management method according to claim 1 is performed.

16. A cache being divided into a plurality of cache lines, each of the plurality of cache lines utilizes a M-bit register to store an age value used for the cache line, respectively, wherein the age value indicates a relative expression of a time interval from a previous hit of the data stored in the cache line, wherein the cache management method according to claim 1 is performed on the cache.

* * * * *